J. A. EDEN, Jr.
CUTTER HEAD.
APPLICATION FILED NOV. 30, 1918.
1,342,535.
Patented June 8, 1920.
3 SHEETS—SHEET 1.
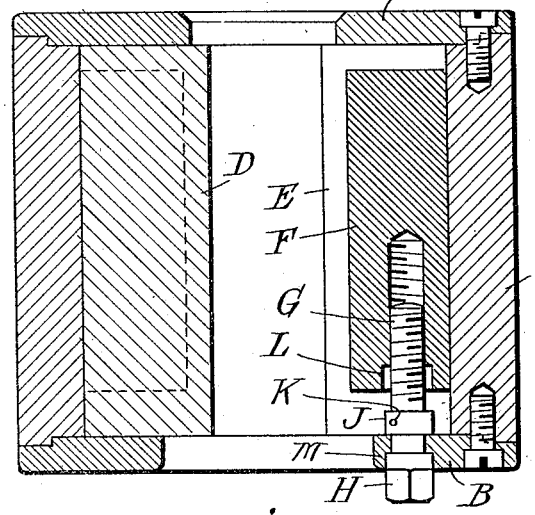
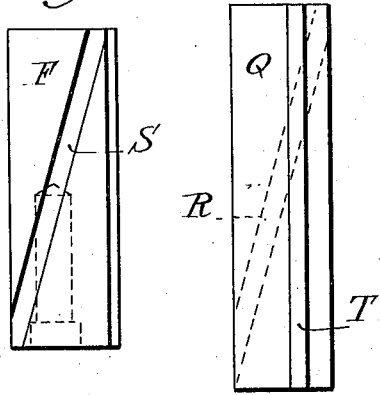
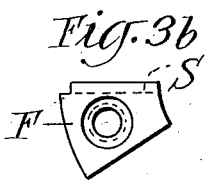
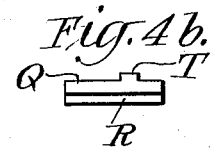
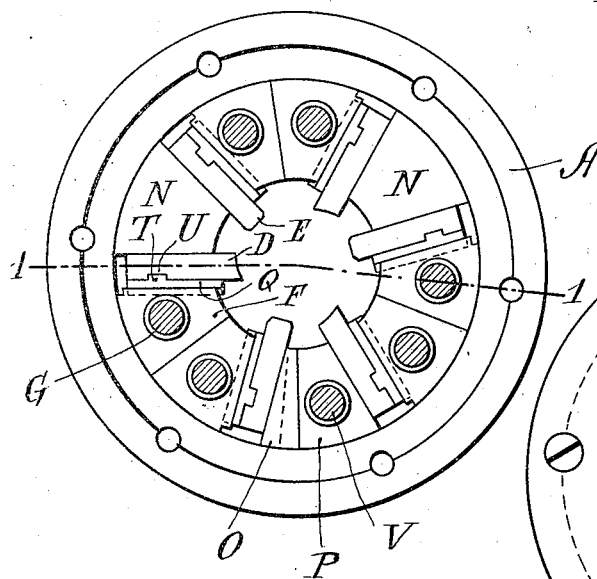
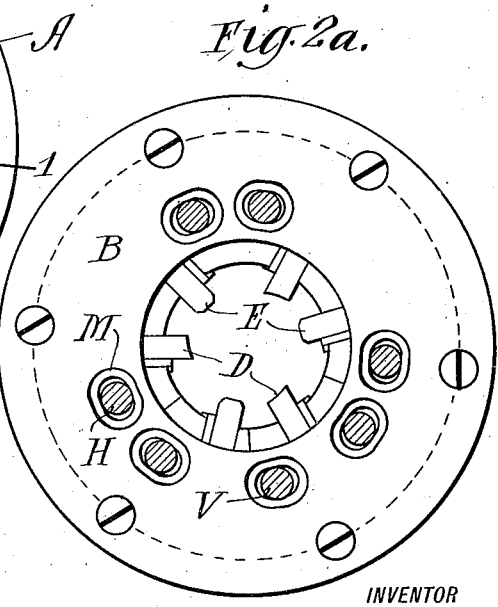
INVENTOR
James A. Eden, Jr.
BY
Anthony Usina, ATTORNEY

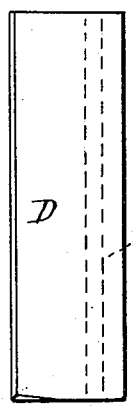
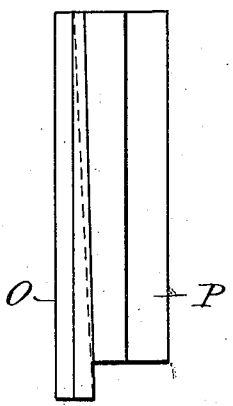
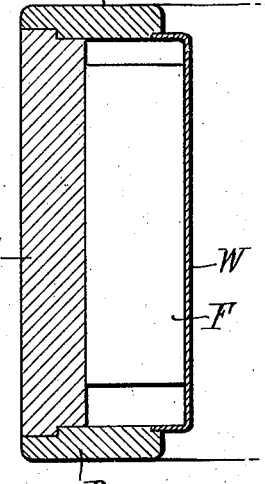
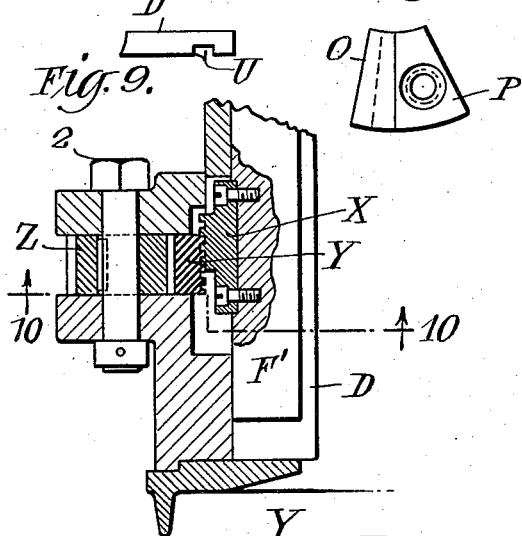
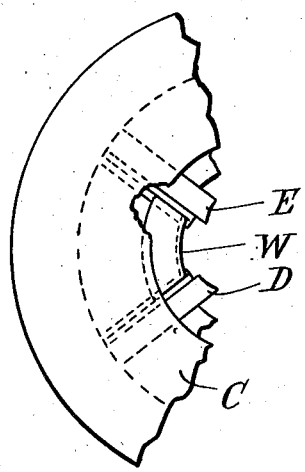
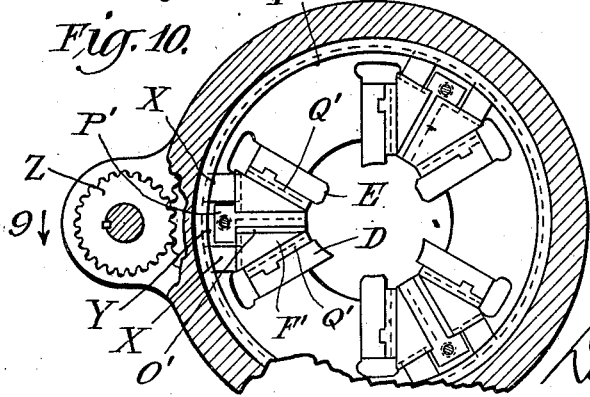

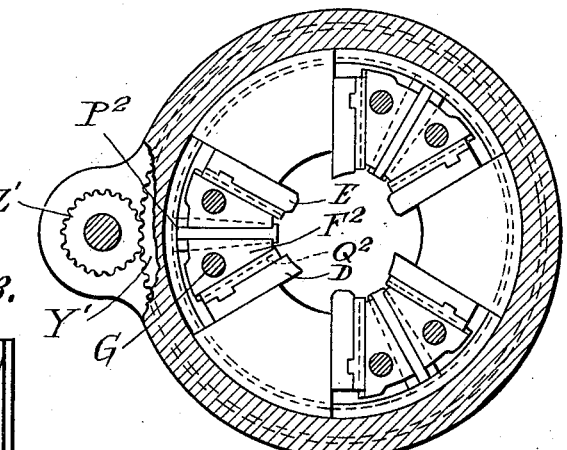
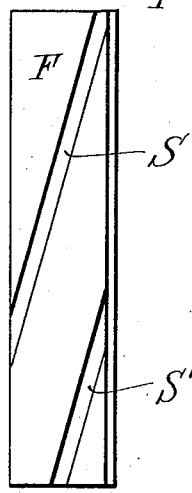
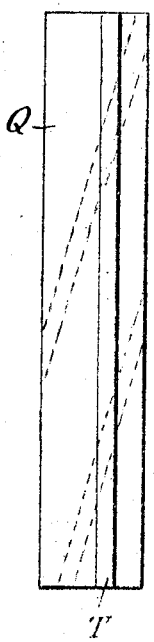
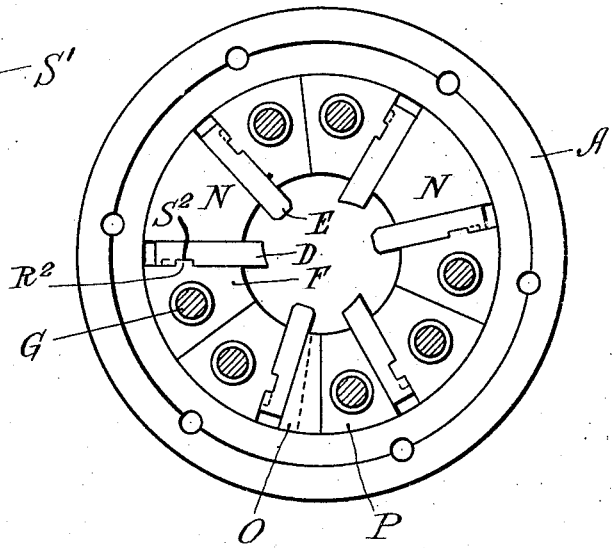

UNITED STATES PATENT OFFICE.

JAMES A. EDEN, JR., OF SPRINGFIELD, MASSACHUSETTS, ASSIGNOR TO WALTER H. FOSTER, OF NEW YORK, N. Y.

CUTTER-HEAD.

1,342,535.　　　　　Specification of Letters Patent.　　Patented June 8, 1920.

Application filed November 30, 1918. Serial No. 264,847.

*To all whom it may concern:*

Be it known that I, JAMES A. EDEN, Jr., a citizen of the United States, residing in Springfield, Massachusetts, have invented certain new and useful Improvements in Cutter-Heads, of which the following is a specification.

This invention aims to provide certain improvements in cutter heads of the class commonly used for turning bolts and for a variety of other purposes, the new construction being simple in construction and easy to adjust for different diameters and having other advantages referred to in detail hereinafter.

The accompanying drawings illustrate embodiments of the invention.

Figure 1 is a longitudinal section of a cutter-head on the line 1—1 of Fig. 2;

Fig. 2 is an underside plan view of the same with the lower end plate removed and the adjusting bolts shown in section;

Fig. 2ª is a similar view with the lower end plate in place and the heads of the adjusting and clamping bolts cut off;

Figs. 3ª and 3ᵇ are respectively a side elevation and an underneath end view of one of the adjusting blocks by which the cutters are set inward or outward to turn bolts of different diameters;

Figs. 4ª and 4ᵇ are similar views of a device which I have called an adapter, for transmitting the radial movement produced by an adjusting block to one of the cutters or guides (which parts I have included in the generic term "blades");

Figs. 5ª and 5ᵇ are similar views of one of these blades, being the cutter in the specific case illustrated;

Figs. 6ª and 6ᵇ are similar views of a coöperating pair of members which I have called clamp blocks, serving to clamp the parts together after the blades have been adjusted to their correct radial positions;

Figs. 7 and 8 are respectively a longitudinal section and an underside end view illustrating a guard for the adjusting blocks, the use of which however is optional;

Figs. 9 and 10 are longitudinal and transverse sections (on the similarly numbered section lines) illustrating an alternative scheme for operating the wedge blocks.

Fig. 11 is a section similar to Fig. 10 but illustraating an alternative construction for actuating the clamp block or blocks which may be used to hold the parts rigidly in their positions of adjustment;

Fig. 12 is a view similar to Fig. 2 showing an alternative construction in which the adapter plates are eliminated;

Figs. 13 and 14 are views similar to Figs. 3ª and 4ª for a longer head.

I have assumed that the cutter head in use stands with its axis in a vertical position, but it may very well be used in machines which carry it in a horizontal position or in any other position. And I have illustrated the blades as having parallel cutting edges for turning cylindrical bolts or the like, but blades with edges inclined from one end to the other may be substituted so as to cut or turn tapered bolts or other tapered work.

Referring particularly to the embodiments of the invention illustrated, the working parts are inclosed within a casing A which is a straight cylinder easily bored, and are held between end plates B and C fastened by screws to the opposite ends of the cylindrical shell and extending a suitable distance within the shell. The cutters D and work guides E bear at their ends against the end plates B and C so as to be adjustable inwardly to the size of the work, lying preferably in radial positions and spaced as shown, though their positions number and relative arrangement may be varied. They are spaced as desired by means of various intermediate members making a group or ring which is adapted to fit loosely within the casing so as to permit easy adjustment of the blades inward or outward. In use, however, this group or ring of members is expanded circumferentially or tangentially to make a tight fit within the casing whereby they are held rigidly in place.

The adjustment of the plates is effected by means of adjusting blocks F (Figs. 3ª and 3ᵇ) which are sector shaped, having a limited longitudinal movement between the end plates B and C and controlled by adjusting screws G screwing into the blocks and fastened in the end plate B by means of their heads H and collars J fixed on their shanks by means of pins K; the lower ends of the blocks are recessed as at L to permit them to pass over the collars J so that they may move from one extreme position to the other between the end plates B and C. The end plate B is provided with slightly elongated slots M (Fig. 2ª) through which the adjusting bolts and clamp bolts pass so that these bolts have freedom for a slight circumferential movement which is necessary in clamping the parts as hereinafter explained. The clamp blocks F are arranged in pairs as shown, each pair between one of the cutters and an adjacent guide. Also between the guides and cutters and in alternating positions with respect to the clamp blocks are filler blocks, two of which N are plain segmental blocks and the third of which is composed of two parts O and P for a purpose hereinafter described.

The movement of the clamp blocks F is transmitted to the side faces of the blades and by a wedging action effects their adjustment. I prefer to secure the wedging action through certain intermediate devices Q which I call adapter plates. These are shown separately in Figs. 4ª and 4ᵇ. On the faces adjacent to the blocks F each adapter plate is provided with an inclined tongue R which fits in a corresponding inclined groove S in the adjuster block. The adapter plates extend the full distance between the end plates B and C of the casing so as to be incapable of longitudinal movement. Consequently as the adjusting blocks are moved endwise the adapter plates are wedged inward or outward. On the opposite face of each adapter plate there is a tongue T engaging a groove U of the blade, this tongue and groove being preferably directly longitudinal for ease of assemblage, but being optionally of other styles, the only functional purpose being to transmit to the blade the inward or outward movement of the adapter plate.

The use of this intermediate adapter plate has certain advantages in construction. It is not desirable to make the inclined tongue and groove engagement directly between the adjusting block and the blades since for blades of considerable length the groove would have to extend through the edge of the blade and weaken this edge. The longitudinal groove U has no such bad effect. For a longer head, the adapter plate can be accordingly lengthened. If we assume a fixed extent of movement for the adjusting block and a fixed angle of the tongue and groove as best suited to give the desired adjustment, the longer adapter plate may have the tongue repeated thereon in whole or in part, the adjusting block being correspondingly lengthened and having its groove also repeated. For example, if a standard length of the adapted plate were six inches (as assumed for Fig. 4ª) and an additional three inches in length were required we would have simply an additional half length R' of tongue, Fig. 14, and groove S', Fig. 13. These adapter plates can be readily made in long bars and cut off as required. The same is true of the adjusting block which is constant in its cross-section regardless of its length, the oblique groove being repeated at regular intervals, say every six inches.

In Fig. 12 I have shown the same principle of adjustment with the inclined tongue and groove engagement directly between the adjusting block F and the blade D, the latter being provided with a groove $S^2$ and the former with a tongue $R^2$. For short heads this can be used without serious disadvantage since the groove $S^2$ may be made of sufficient inclination without running out across the longitudinal edges of the blade. But for longer heads this condition does not apply and it is better to use the adapter plates.

When the blades have been adjusted to the desired positions they are all locked at one operation by means of the two wedge blocks O and P shown separately in Figs. 6ª and 6ᵇ. The block O extends from one to another of the end plates so as to be held against longitudinal movement. The block P is shorter and is adjusted longitudinally by means of a bolt V working in the same way as the adjusting bolts H. The parts O and P have their engaging faces cam-shaped so that as the part P is moved in one direction it exerts a tangential or circumferential pressure against all the other parts within the casing to enlarge the ring which they constitute and to clamp them tightly and rigidly within the cylindrical shell, and as it moves in the opposite direction it releases them so that they stand loose within the shell and permit an easy inward and outward adjustment of the blades.

I have shown in Figs. 7 and 8 a sheet metal guard W extending over each pair of adjusting blocks along their inner faces and overlapping the exposed ends of these parts so as to keep chips from getting into the spaces around these blocks, the ends of the guards being fastened within the inner faces of the end plates B and C. This protector is desirable but not essential.

In Figs. 9 and 10 I have shown an alternative mode of operating the adjusting blocks, which in this illustration are marked F'. They engage adapter plates Q' which have a tongue and groove engagement with the blades D and E, the engagement between adjusting blocks and adapter plates being inclined so as to move these plates inward, and are themselves moved vertically by being provided with blocks X with threads on their outer faces engaging an internal thread on a ring Y which is mounted within the casing and provided with gear teeth on its outer circumference engaged by a pinion Z mounted on a spindle carried in an extension of the casing, the spindle having a square head 2 so that it may be turned by a wrench and all the adjusting blocks simultaneously moved upward or downward to adjust all the plates at once. After this adjustment has taken place the adjusting blocks are spread tangentially by means of a fixed wedge O' and a movable wedge P' analogous to the wedges O and P of Fig. 2, the movable wedge P' being moved longitudinally by any suitable apparatus.

There may be a number of such clamping wedges arranged at intervals around the ring of parts and in such a case the adjusting blocks may be moved separately and the clamping blocks moved at a single operation. For example, in Fig. 11 the adjusting blocks F² act on adapter plates Q² which engage blades D and E, and the adjusting blocks are raised and lowered by separate threaded bolts G. And between each pair of adjuster blocks there is a clamp block P² having wedge shaped faces on opposite sides engaging similar faces on the adjuster blocks so that as the clamp blocks are raised or lowered the ring of parts is expanded or contracted to clamp or unclamp the blades in their adjusted positions. The several clamp blocks P² have segmental threads on their outer faces engaging a screw thread on a common surrounding ring Y' which is provided with spur teeth on its outer face and driven by a pinion Z' as in Figs. 9 and 10.

With the method of clamping described the inner edges of the blades will lie in a larger circle when the ring of parts is expanded than when it is contracted. But the difference is extremely slight, and the blades will be adjusted, in the contracted position of the ring, to a blank which is correspondingly smaller than the bolt to be turned so that when expanded and clamped they will fit exactly to the size required for the bolt. It is customary to turn a large number of bolts of the same size, so that this adjustment is needed very seldom. For turning headed bolts it will be understood that the cutters are provided with cutting edges not only along their longitudinal edges to turn the shank but also on one end in order to face the underside of the head of the bolt. Other styles of cutters may be used, such for example, as chasers or dies for cutting threads. Or the die may be arranged to hold two or more sets of cutters of different sorts as is common in the threading and turning of stay bolts.

Though I have described with great particularity of detail certain specific embodiments of my invention yet it is not to be understood that the invention is restricted to the particular embodiments shown. Various modifications in detail and in the arrangement of the parts may be made by those skilled in the art without departing from the invention as defined in the following claims.

What I claim is—

1. A cutter head including in combination blades spaced apart in the head, means engaging a side face of a blade for adjusting it inward by a movement at an angle to its edge and means for pressing said adjusting means against said blade to clamp it in adjusted position.

2. A cutter head including in combination blades spaced apart in the head, a longitudinally movable wedging means acting on a side face of a blade and adapted by such movement to adjust said blade inwardly with a movement at an angle to its edge and means for pressing said adjusting means against said blade to clamp it in adjusted position.

3. A cutter head including in combination blades spaced apart in the head, wedging means engaging a blade so as to adjust it positively both inward and outward, a screw for moving said wedging means and thereby determining the position of adjustment of said blade and means for pressing said adujsting means against said blade to clamp it in adjusted position.

4. A cutter head including in combination blades spaced apart in the head, wedging means operatively connected with a blade through a tongue and groove, and adapted to move the blade in a direction at an angle to its edge, a screw for operating said wedging means, and means for pressing said wedging means against said blade to clamp it in adjusted position.

5. A cutter head including in combination blades spaced apart in the head and a longitudinally movable member located in the space between two blades, an adapter between said member and one of said blades, said longitudinally movable member having an inclined face engaging said adapter to cam the same inwardly and said adapter engaging said blade to move the same inwardly with it.

6. A cutter head including in combination blades spaced apart in the head and a longitudinally movable member located in the space between two blades, an adapter between said member and one of said blades, said longitudinally movable member having an inclined tongue and groove engagement with said adapter to cam the same positively both inward and outward and said adapter having a substantially or approximately longitudinal tongue and groove engagement with said blade to move the same positively inward and outward with it.

7. A cutter head including in combination blades spaced apart in the head, intermediate members between which said blades are placed, a casing by which said blades and intermediate members are surrounded and means for expanding said group of blades and intermediate members to cause them to fit tightly within said casing.

8. A cutter head including in combination blades spaced apart in the head, intermediate members between which said blades are placed, a casing by which said blades and intermediate members are surrounded, one of said intermediate members being expansible to cause the group of blades and intermediate members to fit tightly within said casing.

9. A cutter head including in combination blades spaced apart in the head, intermediate members between which said blades are placed, a casing by which said blades and intermediate members are surrounded, one of said intermediate members being a cam adapted to expand said group of blades and intermediate members to cause them to fit tightly within the casing.

10. A cutter head including in combination a cylindrical casing, blades and intermediate members arranged in a ring and fitting loosely within said casing to permit adjustment of the blades, means for holding said ring against escape from the casing in a longitudinal direction and means for exerting a circumferential or tangential pressure to expand said ring to a tight fit within the casing.

11. A cutter head including in combination blades spaced apart in the head, means engaging the side faces of the blades for adjusting them inward and a common operating device engaging the several adjusting means.

12. A cutter head including in combination a casing within which are blades adjustable inwardly to the size of the work, adjusting blocks F between said blades having a longitudinal movement and engaging said blades with a wedging engagement and serving also to guide said blades in their radial movement and means for pressing said adjusting blocks F against the blades to clamp them in adjusted position.

In witness whereof, I have hereunto signed my name.

JAMES A. EDEN, Jr.